W. HOWE.
PILE PROTECTOR.
APPLICATION FILED JAN. 28, 1907.
No. 900,929.
Patented Oct. 13, 1908.
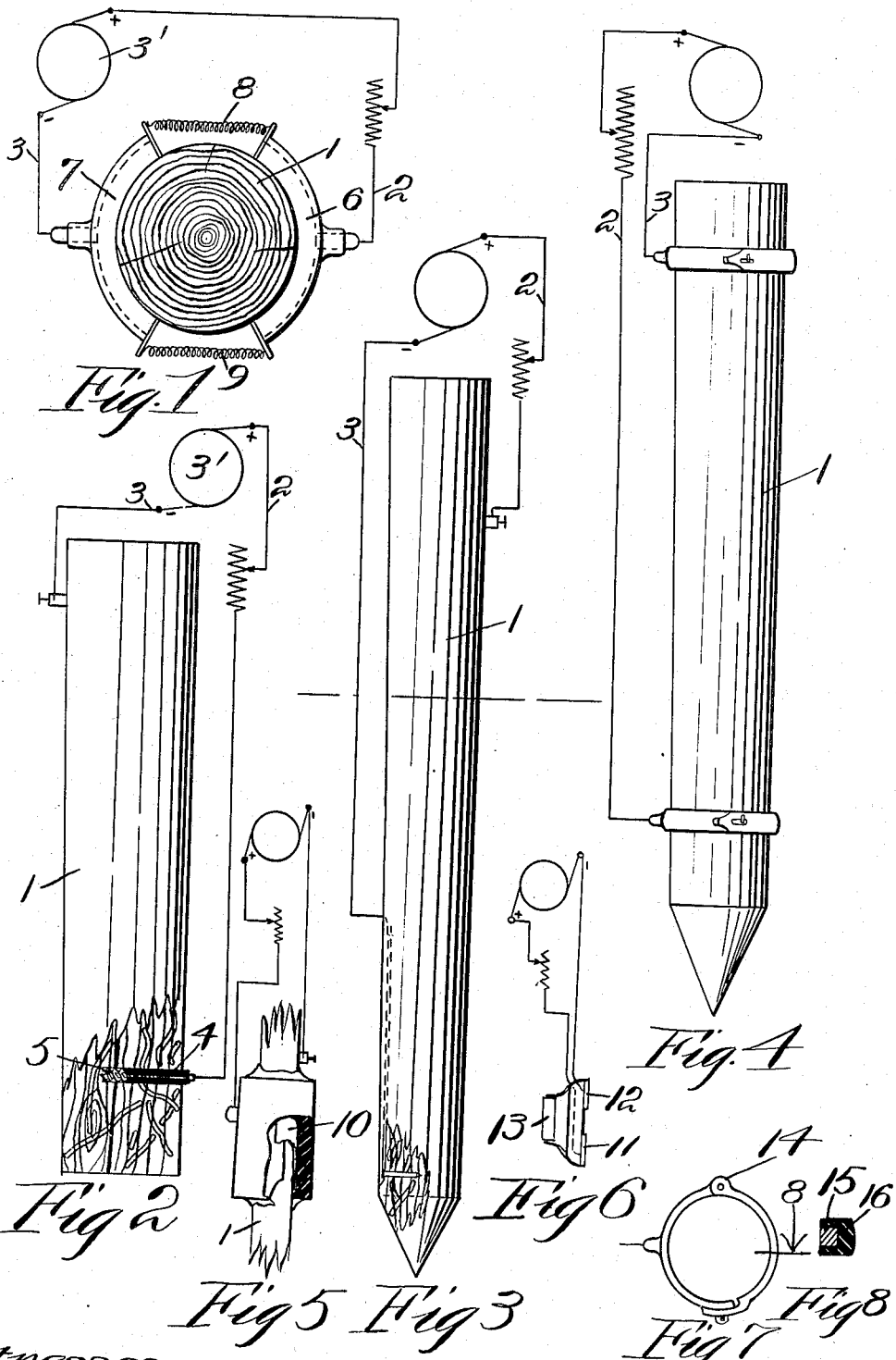
Witnesses
Chas Meyer
H. E. Talbot
Inventor
William Howe
By Paul A. Talbot
His Attorney

UNITED STATES PATENT OFFICE.

WILLIAM HOWE, OF SEATTLE, WASHINGTON.

PILE-PROTECTOR.

No. 900,929.  Specification of Letters Patent.  Patented Oct. 13, 1908.

Application filed January 28, 1907. Serial No. 354,584.

*To all whom it may concern:*

Be it known that I, WILLIAM HOWE, a citizen of the United States, residing at the city of Seattle, (whose post-office address is Victoria Hotel,) in the county of King and State of Washington, have invented new and useful Improvements in Pile-Protectors.

My invention relates primarily to pile protectors in which electricity is used to form a circuit to kill the teredos or other animal growth which is destructive to the pile.

The object of my invention is to provide a means for killing all animal growth in saturated wood by electricity. I accomplish this as well as minor objects by the construction illustrated in the accompanying drawings in which Figure 1 is a plan view of a pile showing a pair of insulated contact members adapted to form a circulation of electricity through the saturated pile. Fig. 2 is a side elevation showing a longitudinal section through the saturated pile having the holes bored and applied after the pile has been driven. Fig. 3 is a side elevation of a pile showing permanent connections for the wires which are applied to piles which are to be driven. Fig. 4 is a side elevation showing the circuit as being made between two rings which are placed around the pile. Fig. 5 is a fragmentary view of a jacket electrode. Fig. 6 is a hand device for removing teredos from hulls or scows. Fig. 7 is a plan view of the rings shown in Fig. 4. Fig. 8 is a section at 8 Fig. 7.

It is obvious that the wires may be connected in a number of different ways, but I do not wish to be limited to the means of connecting the wires to form a circuit through the pile.

Similar reference numerals refer to similar parts throughout the several views illustrated in the accompanying drawings.

The pile 1 after being driven and standing in water will become saturated thus becoming an electric conductor and is used as a conducting member in the circuit through the wires 2 and 3. It has been proved by experiment that teredos which have infected said pile will die when subjected to a high amperage and voltage in the manner shown and hereinafter more fully set forth either by the heat or by the electric current, the water around the pile being heated and the saturated wood which may be perforated or eaten by the teredo probably attains a greater heat than the surrounding water thus killing said teredo.

It is obvious that where piles have been driven under wharves or the like that the application shown in Figs. 1, 4 and 5 may be used and the current may be supplied from a boat to advantage and thus proved a portable teredo destroying outfit which may be equipped to travel among the wharves, trestles and other constructions supported on piles at times where needed, thus from time to time each of the piles may be charged and the animal growth therein killed, but it may be desired to provide a permanent means by which the current may be applied to the piles from the generating plant 3' and by the construction shown in Fig. 2 a hole may be drilled in the lower end of the pile above the ground and the insulated wire and plug 4 having a conducting tip 5 may be inserted. In Fig. 3 I have shown a pile equipped with the wiring before being driven and may be used in new wharves or other pile supported construction.

My device is particularly useful in salt water where the animal growth is disastrous to submerged saturated wood. In Fig. 1 I have shown electrodes 6 and 7 connected to the generating plant 3' and insulated to prevent the largest part of a current from traveling through the water instead of traversing said pile 1, the said electrodes 6 and 7 being held in contact with said pile 1 by springs 8 and 9. I have provided an insulated jacket electrode 10 preferably composed of sheet copper having edges over-lapped and being sufficiently springy to tend to grasp or impinge the pile. The jacket preferably having the ends provided with a rubber closure to prevent any large amount of water from entering within the jacket. I have also provided a device having electrodes 11 and 12 to cook teredos from hulls and scows and by the construction shown in Fig. 6. It is obvious that an insulated handle 13 may be provided thus enabling the movement of said electrodes 11 and 12 to the desired portion of said hull or scow. The rings or electrodes shown in Figs. 4, 7, and 8 are preferably provided with a hinge 14 and are composed of an electrode or conductor 15 having insulation 16 substantially around three sides of said electrode or conductor to prevent a great amount of the current from being lost through the water.

A number of applications of the device having copper electrodes will deposit some of the copper therefrom in the pile and will tend to kill animal growth by its chemical action as the wood will become impregnated with the poisonous copper deposits due to galvanic action in the salt water.

It is obvious that for small piles the current will not have to be as strong as with larger piles and likewise a pile or wood which is out of the water will not require the strength of current as the pile or wood in the water.

Having thus described my invention what I claim as new and desire to secure by Letters Patent of the United States is:

1. In a pile preserver of the nature indicated, a pile, an electrode slidably mounted thereon, means whereby said electrode may be substantially insulated from the surrounding water when submerged.

2. In a destroyer of animal growth in submerged wood, electrodes, a dynamo electric apparatus connected thereto, insulation provided thereon to cause the current from said dynamo electric apparatus to pass through and heat the saturated wood.

3. In a teredo destroyer, segmental electrodes insulated from the surrounding water, and a saturated pile forming an electric conductor between said electrodes.

4. In a teredo destroyer, electrodes, means for supplying one of said electrodes with a positive current and means for connecting the other of said electrodes with a negative current, means for insulating one of said electrodes from the other of said electrodes to cause the current to pass through the saturated wood therebetween.

5. In a teredo destroyer, electrodes, means for supplying one of said electrodes with a positive current and means for connecting the other of said electrodes with a negative current, means for insulating one of said electrodes from the other of said electrodes to cause the current to pass through the saturated wood therebetween, and means whereby said electrodes may be moved on said wood.

6. In a teredo destroyer, a pile, a dynamo electric apparatus, segmental electrodes, each of said electrodes being insulated from the other of said electrodes from the water surrounding the pile, and means whereby said electrodes may be moved longitudinally of said pile.

7. In a teredo destroyer, a pile, a dynamo electric apparatus, segmental electrodes, each of said electrodes being insulated from the other of said electrodes from the water surrounding the pile, means whereby said electrodes may be moved longitudinally of said pile, and means for supplying electricity to said electrodes to heat said pile.

8. In a teredo destroyer, a pile, a dynamo electric apparatus, segmental electrodes, each of said electrodes being insulated from the other of said electrodes from the water surrounding the pile, means whereby said electrodes may be moved longitudinally of said pile, and means for supplying electricity to said electrodes to kill animal growth in said pile.

In testimony whereof, I have signed my name to this specification in the presence of two subscribing witnesses this 19th day of January 1907.

WILLIAM HOWE.

Witnesses:
S. S. HOWELL,
H. E. TALBOT.